United States Patent [19]
Rebecchi

[11] Patent Number: 5,167,184
[45] Date of Patent: Dec. 1, 1992

[54] COMPACTING AND SELECTING MACHINE FOR SOLID AND FERROUS OF NON-FERROUS METALLIC REFUSE SUCH AS CONTAINERS, CANS, BOTTLES, AND SIMILAR

[76] Inventor: Dante Rebecchi, Via Libera Repubblica 15/45, Bettola (Placenza), Italy

[21] Appl. No.: 657,486

[22] Filed: Feb. 15, 1991

[30] Foreign Application Priority Data

Mar. 1, 1990 [IT] Italy .................. 19527 A/90

[51] Int. Cl.⁵ .............. B30B 9/32; B30B 15/14; B30B 15/16; B03C 1/30
[52] U.S. Cl. ...................... 100/91; 100/49; 100/99; 100/131; 100/902; 209/38; 209/634; 241/34; 241/99
[58] Field of Search .......... 100/45, 49, 90, 91, 100/99, 131, 218, 215, 902; 241/99, 34; 220/23.83, 23.86; 414/294, 295; 209/44.1, 38, 634, 636

[56] References Cited

U.S. PATENT DOCUMENTS

| 799,468 | 9/1905 | Jungers | 209/44.1 |
|---|---|---|---|
| 3,687,062 | 8/1972 | Frank | 100/91 |
| 3,872,784 | 3/1975 | Kaszuba | 100/45 |
| 3,926,792 | 12/1975 | Buford | 100/91 |
| 4,084,496 | 4/1978 | Ehernberger | 100/91 |
| 4,119,024 | 10/1978 | White | 100/902 |
| 4,257,511 | 3/1981 | Miller | 100/99 |
| 4,265,170 | 5/1981 | Schulze | 100/91 |
| 4,373,435 | 2/1983 | Grevich | 100/49 |
| 4,480,737 | 11/1984 | Jamgochian | 100/902 |
| 4,483,248 | 11/1984 | Ostreng | 100/91 |
| 4,653,627 | 3/1987 | Mampson | 100/902 |
| 4,667,832 | 5/1987 | Reinfeld | 100/91 |
| 4,989,507 | 2/1991 | Rhoades | 100/902 |

FOREIGN PATENT DOCUMENTS 510580  8/1939  United Kingdom ............... 414/294

Primary Examiner—Philip R. Coe
Assistant Examiner—Till, Terrence R.
Attorney, Agent, or Firm—Herbert Dubno

[57] ABSTRACT

A compacting and selecting machine for solid refuse such as containers and similar includes a loading hopper provided with a detector and guide of objects, a crushing press at the end of the hopper, a lateral conveyor belt to which the object leaving the press is directed by a lateral ejector, the conveyor belt being located over a magnetic plate for the retention of ferrous or similar objects, and at least two collecting bins for the selected objects, one of these bins being for non-ferrous materials and the other for ferrous materials selected by the magnetic plate, the machine cycle being carried out with the aid of auxiliary control device.

6 Claims, 2 Drawing Sheets

COMPACTING AND SELECTING MACHINE FOR SOLID AND FERROUS OF NON-FERROUS METALLIC REFUSE SUCH AS CONTAINERS, CANS, BOTTLES, AND SIMILAR

FIELD OF THE INVENTION

The present invention relates to a device for the collection, selection and volume reduction of containers which are transportable, are made from various materials, and constitute refuse after use.

BACKGROUND OF THE INVENTION

It is known that certain types of transportable containers such as beverage cans, water and wine bottles, tins for preserved food and the like, as well as consumable objects such as batteries, lighters, and similar, are discarded, when empty or used, as normal refuse, thus creating a serious problem of collection, selection of the various types of material, which may also be contaminating, and appropriate disposal. Such objects, owing to their volume, occupy a considerable amount of space, even if they are of reduced weight. This problem is even more evident and noticeable in open areas, where it is difficult to find litter baskets, dustbins, or similar.

OBJECTS OF THE INVENTION

It is therefore a principal object of the invention to provide a device which may be placed in any location, including an open area, and which may be used, after the introduction of an object, to select it according to the material from which it is made, to reduce its volume, and to direct it to differentiated collecting containers.

Another object is to provide the device having a means for resilient sealing so the device may be located in open areas such as those intended for parking, camping or similar, where there is a greater possibility of ecological damage, and must also be protected from rain or moisture to prevent the dissolving and leakage of residues of the materials contained. brass, etc.

A further object of the present invention is to provide such a device that can be made of a material which may subsequently to a disposal of the device be re-used, for example in the case of initial materials such as iron, glass, aluminium, brass, etc.

SUMMARY OF THE INVENTION

These technical problems are solved according to the present invention with a compacting and selecting machine for solid refuse such as containers and similar, comprising a combination of a loading hopper provided with a detector and guide of objects, a crushing press at the end of the said hopper, a lateral conveyor belt to which the object leaving the press is directed by a lateral ejector, the conveyor belt being located over a magnetic plate for the retention of ferrous or similar objects, and at least two collecting bins for the selected objects, one of these bins being for non-ferrous materials and one for ferrous materials selected by the magnetic plate, the machine cycle being carried out with the aid of programming means.

In the compacting and selecting machine for solid refuse according to the invention there should preferably be at least three of the collecting bins, of which one is associated with a selecting element of the vibrating sieve type for the collection of glass residues fragmented by the press and each collecting bin should be provided with a means for detecting fullness, such as photocells or the like, located on the edge in the overfilling position, the signals from which, when detected by the programming means, activate the locking of the opening hatch of the hopper. In a preferred form, the compacting and selecting machine is also provided with a second hopper, which allows contaminating and hazardous objects to be introduced with separate collection of these in bins appropriately located adjacent to the exit point of the contaminating or similar materials and additional means for collecting any liquid residues from the compacted containers.

BRIEF DESCRIPTION OF THE DRAWINGS

The above and other objects, features and advantages of my invention will become more readily apparent from the following description, reference being made to the accompanying highly diagrammatic drawing in which.

DESCRIPTION

Figure 1:
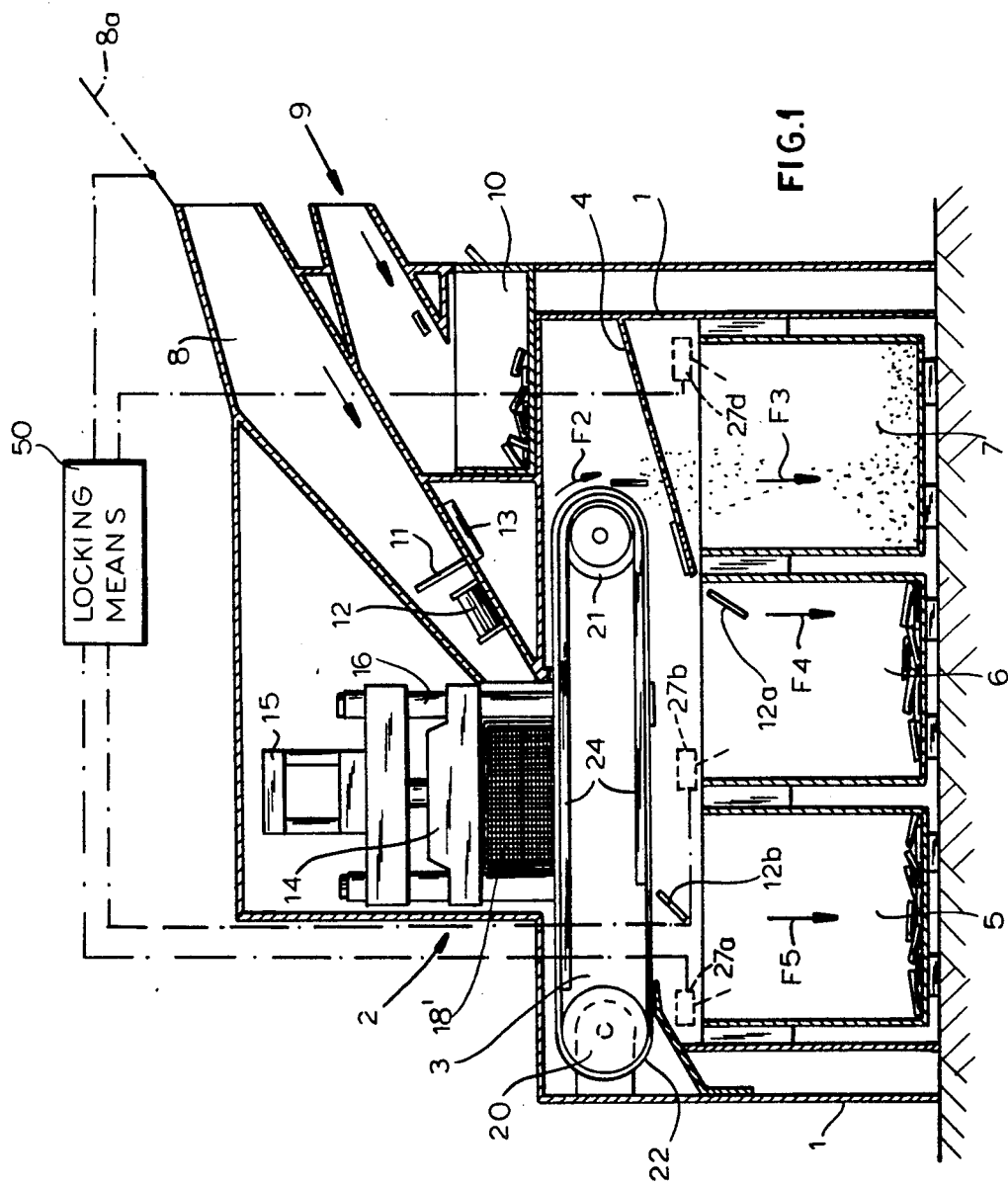
FIG. 1 is a vertical longitudinal section of the machine.

With reference to these figures, the machine comprises a supporting frame 1, substantially in the form of a parallelepiped, supporting above its upper horizontal plane a hydraulic or similar press indicated generally by 2. Under the press a conveyor belt 3, a sieve 4, and refuse collection bins 5, 6 and 7 are located. At the side of the press 2 there is a hopper 8 for the introduction of refuse consisting of containers made of different materials and having different types, and a second hopper 9, with an extraction bin 10 beneath, for refuse consisting of contaminating or hazardous materials such as batteries, lighters, pressurized canisters, and similar.

Within the refuse introduction hopper 8 a deflector 11 is mounted which causes the waste object 12 to slide with its smaller dimension at the lower end. A detector of objects 13 is arranged transversely with respect to the hopper 8 and is capable of signalling the passage of any object introduced into the aperture 8 and of the hopper 9.

Figure 2:
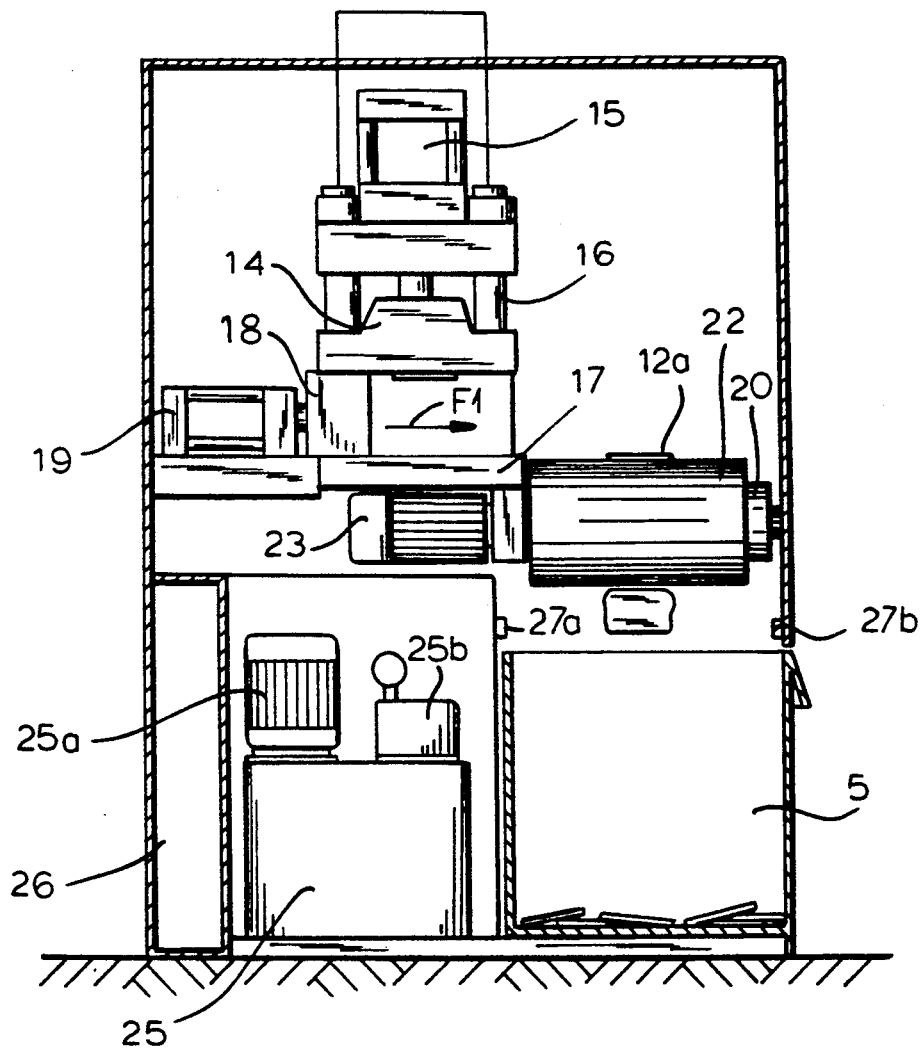
FIG. 2 is a vertical cross-section of the machine.

The said press 2 is arranged as shown in FIG. 1; at the end of the hopper 8, and comprises a ram 14 operated by the cylinder 15 and guided by the columns 16, and a press table 17 (FIG. 2) receiving the refuse introduced into the upper hopper 8. Within the operating chamber of the press 2 there is arranged a net 18 or the like that prevents the outward projection of parts of objects during crushing.

A lateral ejector 18 operated by a cylinder 19 is provided at the side of the said press 2, this ejector impelling in the direction of the arrow F1 any object present in the chamber of the press 2. The conveying assembly 3, comprising a pair of rollers 20–21 with a close loop conveyor 22 in between which is located at the side of the press and on the side opposite that of the ejector 18.

The roller 20 is connected to a motor assembly 23 which provides the continuous motion of the belt 22 in the direction of the arrow F2. Within the loop of the conveyor belt 22 is arranged a magnetic plate 24 which extends from the front roller 20 to the rear roller 21 and follows it, keeping in contact with the return section of the conveyor belt 22 until it is above the collection bin 5.

The machine is completed by a hydraulic or similar control unit 25 with its own motor 25a and regulator 25b, and by a container 26 for the collection of any liquid issuing from the cans, containers, bottles or similar introduced into the machine.

The collecting bins 5, 6, 7 and 10 for the various materials are each provided with photocells 27a–27b capable of signalling when a bin is completely full and of identifying the bin in question.

The machine operates in the following way:

The used object constituting a piece of refuse, such as a container, metal can, bottle or similar, for example a can 12, is introduced through the opening hatch 8a into the introduction hopper 8, and while falling through the hopper is detected by the detector 13, which activates the control unit 25 and starts the automatic processing program.

If the can or similar 12 moves in a transverse orientation it strikes the deflector 11 which causes it to proceed with its longest axis towards the table of the press. When the object 12 has arrived on the press bed and is contained by the lateral screens 18', the press 2 is supplied with power by the control unit 25, causing the ram 14 to descend until it completely crushes the object 12 reducing it to the smallest possible thickness, and then to ascend, returning to the rest position. The program then continues, activating the cylinder 19 which impels the lateral ejector in the direction of the arrow F1 so that the crushed object 12a is deposited on the conveyor belt 22. At this point the crushed object 12a is conveyed to a point above the magnetic plate 24 and follows the course of the belt, being subsequently selected as follows: a) if the object consists of a non-metallic but friable material such as glass, hard plastic, or similar, then on passing the rear roller 21 it falls on to the vibrating material selector 4 and passing through the apertures of this selector falls into the collecting bin 7, as shown by the arrow F3;

b) if the object consists of non-magnetic metal (aluminium, brass, zinc, etc.), then the object 12a, not being held by the magnetic plate against the belt 22, falls from the rear roller 21 on to the selector 4, but being unable to pass through the apertures of the selector, slides along the selector which is arranged in the form of an inclined plane for this purpose, and eventually falls as shown by the arrow F4 into the bin 6 for metal or other non-magnetic refuse; or c) if the object consists of ferrous material (such as beverage cans or tins for preserved food or similar of any type), the object 12b is held by the magnetic plate 24 throughout the whole travel of the belt as far as the end of the magnetic plate which is located above the bin 5, so that the object 12b falls as shown by the arrow F5 to rest on the bottom like the other objects.

At the end of the cycle, the program stops the control unit 25 and restarts when a new object is inserted into the hopper 8.

If the object consists of harmful elements, such as batteries, lighters, pressurized canisters or similar, the user must introduce it into the second hopper 9 which introduces the object into the appropriate bin 10 arranged for the purpose, following the instructions placed on the outside of the machine for the benefit of the user.

Consequently, according to the invention, the compacting machine described above permits the automatic performance, without the aid of any personnel except for the removal of full bins following indication by the device itself provided by the said photocells 27a–27b, of the selective collection of magnetic and non-magnetic metal refuse, of glass, friable or similar refuse, and of contaminating or similar refuse, the objects being collected in separate bins so that they may be removed for any subsequent use already divided and selected, when the bins are completely filled. In particular, for reasons of safety, when at least one of the collecting bins is full the photocells 27a, 27b send a signal which causes the opening hatch 8a to be locked by locking means (50), preventing the subsequent introduction of objects which might cause the breakage of the machine or similar.

It is to be understood that each of the operations may be further subdivided or selected with other equipment or similar and that one of more of the operations may be eliminated without thereby departing from the scope protected of the present invention.

I claim:

1. An apparatus for compacting and selecting solid refuse, said apparatus comprising:
   a frame
   a hopper mounted on said frame and inclined inwardly and downwardly, said hopper being formed with a mouth receiving refuse and with a discharge end spaced from said mouth;
   guiding means mounted in said hopper for guiding the refuse;
   detecting means for generating a signal upon detecting said refuse guided through said hopper toward said discharge end;
   crushing means mounted on said frame for crushing said refuse in response to said signal, said crushing means being formed with:
   a chamber provided with a press table communicating with said discharge end of the hopper,
   a ram movable vertically between lower and upper positions in said chamber, and
   an ejector movable horizontally perpendicular to said ram upon crushing the refuse against said press table and expelling said refuse from said chamber in said upper position of the ram;
   a closed loop conveyor belt extending horizontally perpendicular to said ejector and having an upper stretch receiving said refuse upon expelling said refuse from said chamber and a lower stretch;
   magnetic means for retention of refuse made of ferrous materials, said magnetic means being juxtaposed with an inner side of said belt, and said magnetic means extending along said upper stretch and terminating at said lower stretch;
   a plurality of collecting bins below said belt and provided with respective openings facing said lower stretch of said belt for selectively receiving the refuse from said belt; and
   controlling means for controlling said crushing means and said ejector.

2. The apparatus defined in claim 1 wherein said magnetic means includes a continuous magnetic plate.

3. The apparatus defined in claim 1, further comprising a selector mounted on said frame and extending angularly inwardly toward said bins, so that the refuse made of a nonferrous material falls down on said selector and guided to a respective one of said bins.

4. The apparatus defined in claim 3 wherein said selector sieves the refuse capable of falling through openings formed on said selector and received by a respective one of said bins.

5. The apparatus defined in claim 1, further comprising locking means operatively connected with said hopper for sealing the latter, each of said plurality of bins being provided with a respective photocell for detecting a predetermined fullness of the bin and operatively connected with said locking means blocking said hopper in response to a respective signal produced by each of said photocells.

6. The apparatus defined in claim 5, further comprising another hopper provided with a respective mouth for collecting used batteries, lighters or pressurized canisters and with a respective storage compartment directly communicating with said another hopper.

* * * * *